US011392337B2

(12) United States Patent
Suzuki

(10) Patent No.: US 11,392,337 B2
(45) Date of Patent: Jul. 19, 2022

(54) SERVER APPARATUS, SYSTEM, SERVER SYSTEM, AND INFORMATION PROCESSING METHOD

(71) Applicant: Ryoichi Suzuki, Kanagawa (JP)

(72) Inventor: Ryoichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/911,752

(22) Filed: Jun. 25, 2020

(65) Prior Publication Data

US 2021/0026583 A1 Jan. 28, 2021

(30) Foreign Application Priority Data

Jul. 24, 2019 (JP) ............................ JP2019-136057

(51) Int. Cl.
*G06F 3/12* (2006.01)
*G06K 15/02* (2006.01)

(52) U.S. Cl.
CPC .......... *G06F 3/1255* (2013.01); *G06F 3/1206* (2013.01); *G06F 3/1208* (2013.01); *G06K 15/1836* (2013.01); *G06F 3/1204* (2013.01); *G06F 3/1288* (2013.01)

(58) Field of Classification Search
CPC .... G06F 3/1255; G06F 3/1208; G06F 3/1206; G06F 3/1288; G06F 3/1247; G06F 3/1204; G06K 15/1836
USPC ........................................................ 358/1.15
See application file for complete search history.

(56) References Cited

U.S. PATENT DOCUMENTS

| | | | | |
|---|---|---|---|---|
| 10,649,700 | B2 * | 5/2020 | Yamakawa | G06F 3/1298 |
| 2009/0201518 | A1 * | 8/2009 | Hino | G06K 15/1855 358/1.9 |
| 2012/0218602 | A1 * | 8/2012 | Sakura | G06F 3/1208 358/1.15 |
| 2013/0121620 | A1 | 5/2013 | Suzuki | |
| 2016/0342577 | A1 | 11/2016 | Ando | |
| 2019/0102117 | A1 * | 4/2019 | Hidaka | G06F 3/1219 |

FOREIGN PATENT DOCUMENTS

| | | |
|---|---|---|
| JP | 2001-016376 | 1/2001 |
| JP | 2016-081336 | 5/2016 |
| JP | 2016-218704 | 12/2016 |

* cited by examiner

*Primary Examiner* — Darryl V Dottin
(74) *Attorney, Agent, or Firm* — Harness, Dickey & Pierce, P.L.C.

(57) ABSTRACT

A server apparatus includes circuitry to: receive, from an image forming apparatus, determination information including first determination information for identifying a type of print data received by the image forming apparatus, and second determination information for identifying a type of print data with which the image forming apparatus can generate drawing data; determine which of the image forming apparatus and the server apparatus is to generate drawing data from the print data, based on the determination information; in response to the circuitry determining that the image forming apparatus is to generate the drawing data, transmit instruction information for instructing generation of the drawing data to the image forming apparatus; and in response to the circuitry determining that the server apparatus is to generate the drawing data, control generation of the drawing data from the print data and transmission of the generated drawing data to the image forming apparatus.

16 Claims, 5 Drawing Sheets

100
MFP
110
101
CPU
102
MEM-P
102a
ROM
102b
RAM
103
NB
104
SB
AGP BUS 121
106
ASIC
107
MEM-C
108
HDD CONTROLLER
109
HD
PCI BUS 122
130
ENGINE CONTROLLER
132
PRINTER
131
SCANNER
140
140a
140b
150
NETWORK I/F
120
SHORT-RANGE COMMUNICATION CIRCUIT
120a

FIG. 6A

| DRIVER | MANUFACTURER | PAGE DESCRIPTION LANGUAGE | VERSION |
|---|---|---|---|
| D1(BK) | M1 | L1 | 6 |

FIG. 6B

| GENERATOR | SUPPORTING DRIVER | MANUFACTURER | PAGE DESCRIPTION LANGUAGE | VERSION |
|---|---|---|---|---|
| d2 | D2(COLOR) | M2 | L1 | 6 |

FIG. 6C

| GENERATOR | SUPPORTING DRIVER | MANUFACTURER | PAGE DESCRIPTION LANGUAGE | VERSION |
|---|---|---|---|---|
| d3 | D3(COLOR) | M2 | L1 | 5 |
| d4 | D4(BK) | M3 | L1 | 6 |
| d5 | D5(COLOR) | M4 | L2 | 6 |
| d6 | D6(COLOR) | M5 | L3 | 3 |

SERVER APPARATUS, SYSTEM, SERVER SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2019-136057, filed on Jul. 24, 2019, in the Japan Patent Office, the entire disclosure of which is hereby incorporated by reference herein.

BACKGROUND

Technical Field

The present invention relates to a server apparatus, a system, a server system, and an information processing method.

Description of the Related Art

Conventionally, the image forming apparatus prints an image based on print data, which is generated by a printer driver installed on a computer, and transmitted from the computer. The print data is, for example, data in a page description language (PDL) format. The image forming apparatus can print the image based on the print data by generating drawing data (for example, raster data) from the print data.

However, when the image forming apparatus does not support the printer driver on the computer, the image forming apparatus may be unable to appropriately generate the drawing data.

In view of the above, an image forming apparatus has been proposed which determines whether drawing data can be generated from received print data. When the image forming apparatus determines that the drawing data can be generated, the image forming apparatus generates the drawing data. On the other hand, when the image forming apparatus determines that no drawing data can be generated, the image forming apparatus transmits (transfers) the print data to an external server to request the server to generate the drawing data from the print data.

In the above technique, the image forming apparatus determines which of the image forming apparatus and the server generates the drawing data. Therefore, the processing load required for determining which of the image forming apparatus and the server generates the drawing data becomes excessive on the image forming apparatus.

SUMMARY

Example embodiments include a server apparatus communicably connected to an image forming apparatus, the server apparatus including circuitry to: receive, from the image forming apparatus, determination information including first determination information for identifying a type of print data received by the image forming apparatus, and second determination information for identifying a type of print data with which the image forming apparatus can generate drawing data; determine which of the image forming apparatus and the server apparatus is to generate drawing data from the print data, based on the determination information; in response to the circuitry determining that the image forming apparatus is to generate the drawing data, transmit instruction information for instructing generation of the drawing data to the image forming apparatus; and in response to the circuitry determining that the server apparatus is to generate the drawing data, control generation of the drawing data from the print data and transmission of the generated drawing data to the image forming apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 6A, 6B and 6C are diagrams illustrating information used for determining which generator is used to generate drawing data, according to an embodiment.

Figure 1:
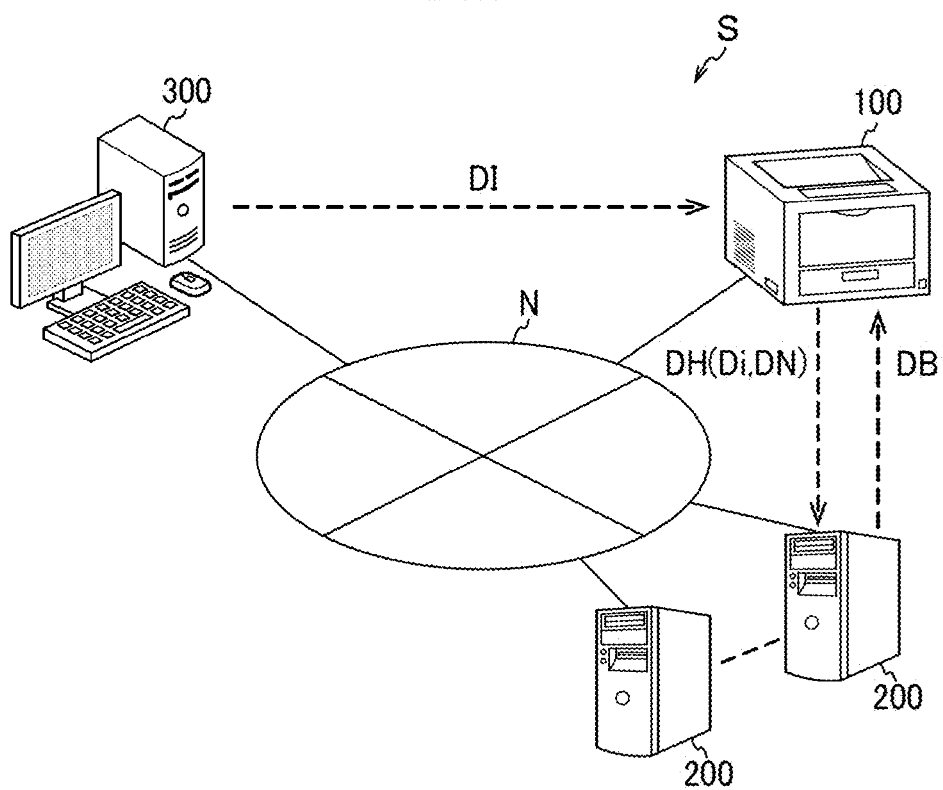
FIG. 1 is a diagram illustrating a configuration of an information processing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms “a”, “an” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

FIG. 1 is a diagram for describing each configuration of an information processing system S according to the present embodiment. As illustrated in FIG. 1, the information processing system S includes a multifunction printer (MFP) 100 and a server 200 (cloud server). Each of the components in the information processing system S can communicate via a network N to one another. A personal computer 300 is communicably connected to the MFP 100 via the network N.

The MFP 100 includes a printing function, and prints an image selected by a user of the personal computer 300, for example. The MFP 100 can communicate with a portable terminal, and may print an image selected by a user of the portable terminal.

Although FIG. 1 illustrates a specific example including one MFP 100, the information processing system S may include a plurality of MFPs 100. In the present embodiment, although the MFP 100 is employed, any device other than the MFP 100 may be employed as long as the device has a printing function.

The personal computer 300 stores in its memory various kinds of application programs. Using the application programs, the personal computer 300 can generate various types of image data. The personal computer 300 may acquire the image data from the outside.

The personal computer 300 is installed with a printer driver that instructs the MFP 100 to print an image based on image data. In response to an instruction to print an image, the printer driver in the personal computer 300 generates print data DI from image data.

The print data DI is data in a page description language (PDL) format. The MFP 100 can print an image based on the print data DI by generating drawing data DB (for example, raster data) from the print data DI. More specifically, the MFP 100 executes a raster image processor (RIP) to process the print data DI to generate the drawing data DB. The print data DI and the drawing data DB are not limited to the example, and data in various formats may be adopted for the print data DI and the drawing data DB.

The page description language of the print data DI differs depending on the type of the printer driver which generated the print data DI. Although the page description language of each of the print data DI may be the same, the version of the page description language may differ in each of the print data DI.

In the present embodiment, "type of print data DI" can be defined by a combination of the page description language and the version of the print data DI. That is, types of print data DI are considered different, if page description languages of the print data DI are different from one another, or versions of the print data DI are different from one another although the page description languages of the print data DI are the same.

The MFP 100 generally does not support all types of print data DI. When the MFP 100 receives print data DI whose type is unsupported by the MFP 100, the MFP 100 may not capable of generating drawing data DB from the print data DI. In this case, inconvenience may occur as the MFP 100 cannot print an image based on the print data DI.

In view of the above, the information processing system S according to the present embodiment eliminates this inconvenience, by employing a server 200.

When the MFP 100 receives print data DI, the MFP 100 transmits a part of the print data DI to the server 200. More specifically, the MFP 100 transmits a part of the print data DI that can identify the type of the print data DI to the server 200. Hereinafter, the part of the print data DI transmitted to the server 200 may be referred to as "first determination information Di".

With this configuration, a data transmission period (processing load) required for transmitting the print data DI is reduced, as compared to a configuration in which the entire print data DI is transmitted to the server 200, for example. However, the present invention does not exclude the configuration in which the entire print data DI is transmitted to the server 200. Further, as long as the MFP 100 can identify the type of the received print data DI, data other than the print data DI (a part or the whole thereof) may be adopted as the first determination information Di.

The MFP 100 transmits second determination information DN to the server 200. The second determination information DN is information for identifying the type of the print data DI with which the MFP 100 can generate the drawing data DB. More specifically, the second determination information DN is information (capability information) for specifying the page description language of the print data DI and the version of the page description language of the print data DI with which the MFP 100 can generate the drawing data DB.

In this disclosure, the type of the print data DI with which the MFP 100 can generate the drawing data DB will be referred to as a "predetermined type". The predetermined type of the print data DI may be one type or plural types. The type (predetermined type) of the print data DI with which the MFP 100 can generate the drawing data DB is predetermined according to, for example, the specification of the MFP 100, for each of the MFPs 100.

It is assumed that the page description language of the print data DI received by the MFP 100 and the page description language supported by the MFP 100 are the same. In this case, even when the version of the print data DI received by the MFP 100 and the version of the print data DI supported by the MFP 100 are different from each other, the MFP 100 can generate the drawing data DB.

That is, even when the type of the print data DI received by the MFP 100 is different from the type of the print data DI supported by the MFP 100, the MFP 100 can generate the drawing data DB. As can be understood from the description, the predetermined type of print data DI described above may include, in addition to the type of the print data DI actually supported by the MFP 100, the type of the print data DI with which the MFP 100 can generate the drawing data DB, among the types of print data DI unsupported by the MFP 100. Varied examples will be described referring to FIGS. 6A to 6C.

In the present embodiment, for the sake of explanation, the first determination information Di (a part of the print data DI) and the second determination information DN (predetermined type), which are transmitted to the server 200, may be collectively referred to as "determination information DH". In the determination information DH, the time when the first determination information Di is transmitted and the time when the second determination information DN is transmitted may be different or may be substantially the same.

The server 200 determines which of the MFP 100 and the server 200 is to generate the drawing data DB according to the determination information DH. More specifically, the server 200 identifies the type (page description language, version) of the print data DI received by the MFP 100 from the first determination information Di of the determination information DH.

The server 200 identifies the predetermined type (the type of print data DI with which the MFP 100 can generate the drawing data DB) from the second determination information DN of the determination information DH. For example, when the type of the print data DI specified from the first determination information Di is not the predetermined type, the server 200 determines that the server 200 generates the drawing data DB.

When the server 200 determines that the server 200 generates the drawing data DB, the server 200 acquires the entire print data DI from the MFP 100. The server 200 includes a plurality of RIP processors, which are implemented by a plurality of programs capable of executing RIP processing functions that are different from one another. The plurality of RIP processors respectively correspond to a plurality of types of printer drivers, such that the RIP processors can generate the drawing data DB from the plurality of types of the print data DI. Specifically, the server 200 generates the drawing data DB from the print data DI by using the RIP processor corresponding to the print data DI acquired from the MFP 100, from among the RIP processors that are available.

As illustrated in FIG. 1, the information processing system S includes a plurality of servers 200. The servers 200 include a plurality of RIP processors that are different from one another. For example, it is assumed that the server 200, which receives the print data DI, cannot generate the drawing data DB using the RIP processor of the server 200. In such case, the server 200 identifies another server 200 that can generate the drawing data DB from the received print data DI, and transfers the print data DI to the another server 200 that is identified.

The server 200, which is capable of generating the drawing data DB, transmits the drawing data DB generated by the RIP processor to the MFP 100. The MFP 100 prints an image from the drawing data DB received from the server 200. In the present embodiment, even when the MFP 100 receives print data DI which is the type with which the MFP 100 cannot generate the drawing data DB, the MFP 100 is able to print an image based on the print data DI using the drawing data DB from the server 200.

Figure 2:
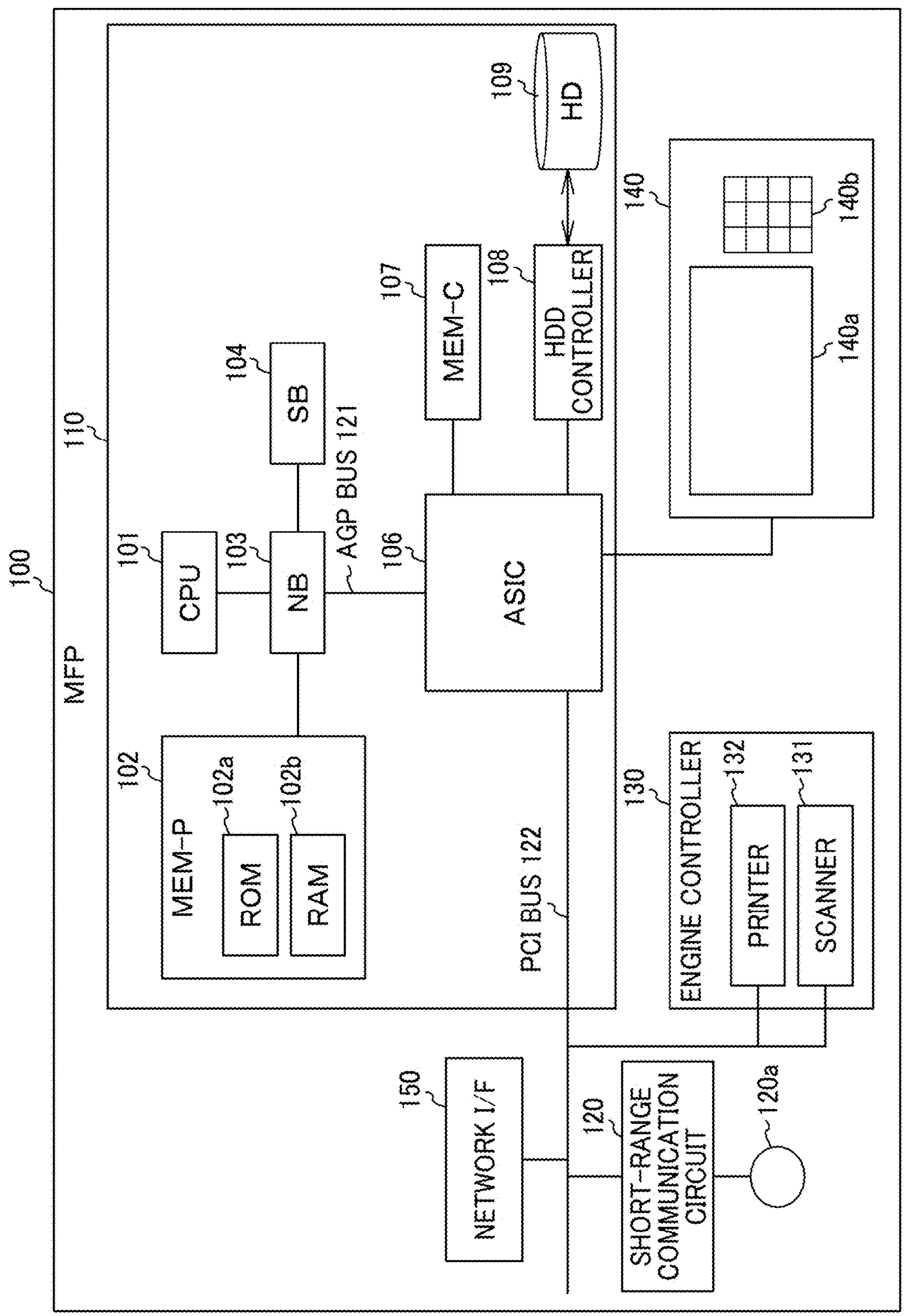
FIG. 2 is a diagram illustrating a hardware configuration of a multifunction functional peripheral (MFP) according to an embodiment.

FIG. 2 is a hardware configuration diagram of the MFP 100 according to the embodiment. As illustrated in FIG. 2, the MFP 100 includes a controller 110, a short-range communication circuit 120, an engine controller 130, a control panel 140, and a network interface (I/F) 150.

The controller 110 includes a central processing unit (CPU) 101, a system memory (MEM-P) 102, a north bridge (NB) 103, a south bridge (SB) 104, an application specific integrated circuit (ASIC) 106, a local memory (MEM-C) 107 which is a storage, and a hard disk drive (HDD) controller 108, and a hard disk (HD) 109, which is a storage. The controller 110 includes an accelerated graphics port (AGP) bus 121 that connects the NB 103 and the ASIC 106.

The CPU 101 is a controller that controls the entire MFP 100. The NB 103 is a bridge for connecting the CPU 101 with the MEM-P 102, the SB 104, and the AGP bus 121. The NB 103 includes a memory controller that controls reading and writing to the MEM-P 102 and the like, and a peripheral component interconnect (PCI) master and an AGP target.

The MEM-P 102 includes a read only memory (ROM) **102*a* that is a memory which stores programs and data for implementing each function of the controller 110, and a random access memory (RAM) 102*b* which is used for deploying programs and data and as a drawing memory for printing and the like. Alternatively, any program stored in the RAM 102*b*** may be previously stored in a computer-readable recording medium, such as CD-ROM, CD-R, DVD, in the form of a file in an installable format or an executable format for distribution.

The SB 104 is a bridge for connecting the NB 103 to a PCI device or a peripheral device. The ASIC 106 is an integrated circuit (IC) for image processing applications having a hardware element for image processing, and operates as a bridge that connects the AGP bus 121, the PCI bus 122, the HDD controller 108, and the MEM-C 107, respectively.

The ASIC 106 includes a PCI target and an AGP master, an arbiter (ARB) which is the core of the ASIC 106, a memory controller for controlling the MEM-C 107, a plurality of direct memory access controllers (DMACs) that process rotation of image data by hardware logic, and a PCI unit that performs data transfer between a scanner 131 and a printer 132 via the PCI bus 122. The ASIC 106 may be connected to an interface for a universal serial bus (USB) or an interface for IEEE1394 (Institute of Electrical and Electronics Engineers 1394).

The MEM-C 107 is a local memory used as a copy image buffer and a code buffer. The HD 109 is a storage for storing image data, font data used in printing, and forms. The HDD controller 108 controls reading or writing of data from/to the HD 109 under control of the CPU 101. The AGP bus 121 is a bus interface for a graphics accelerator card proposed for accelerating graphic processing. The AGP bus 121 can accelerate the graphics accelerator card by directly accessing the MEM-P 102 at high throughput.

The short-range communication circuit 120 may be connected to an antenna **120*a*. The short-range communication circuit 120 is a communication circuit such as NFC (Near Field Communication) and Bluetooth (registered trademark). The engine controller 130 includes the scanner 131 and the printer 132. The control panel 140 includes a panel display 140*a* such as a touch panel that displays a current setting value, a selection screen, and the like, and receives an input from an operator. The control panel 140 further includes a control panel 140*b*** including a numeric keypad receiving a configuration value for a condition relating to image formation, such as a density configuration condition, a start key for receiving a copy start instruction, and the like.

The controller 110 controls the entire MFP 100, and controls, for example, drawing, communication, and input from the control panel 140. The scanner 131 or the printer 132 includes an image processor such as error diffusion and gamma conversion.

The MFP 100 can sequentially switch a document box function, a copy function, a printer function, and a facsimile function by using an application switching key on the control panel 140. When the document box function is selected, a document box mode is selected. When the copy function is selected, a copy mode is selected. When the printer function is selected, a printer mode is selected. When the facsimile function is selected, a facsimile mode is selected.

The network I/F 150 is an interface for performing data communication by using a communication network. The short-range communication circuit 120 and the network I/F 150 are electrically connected to the ASIC 106 via the PCI bus 122.

Figure 3:
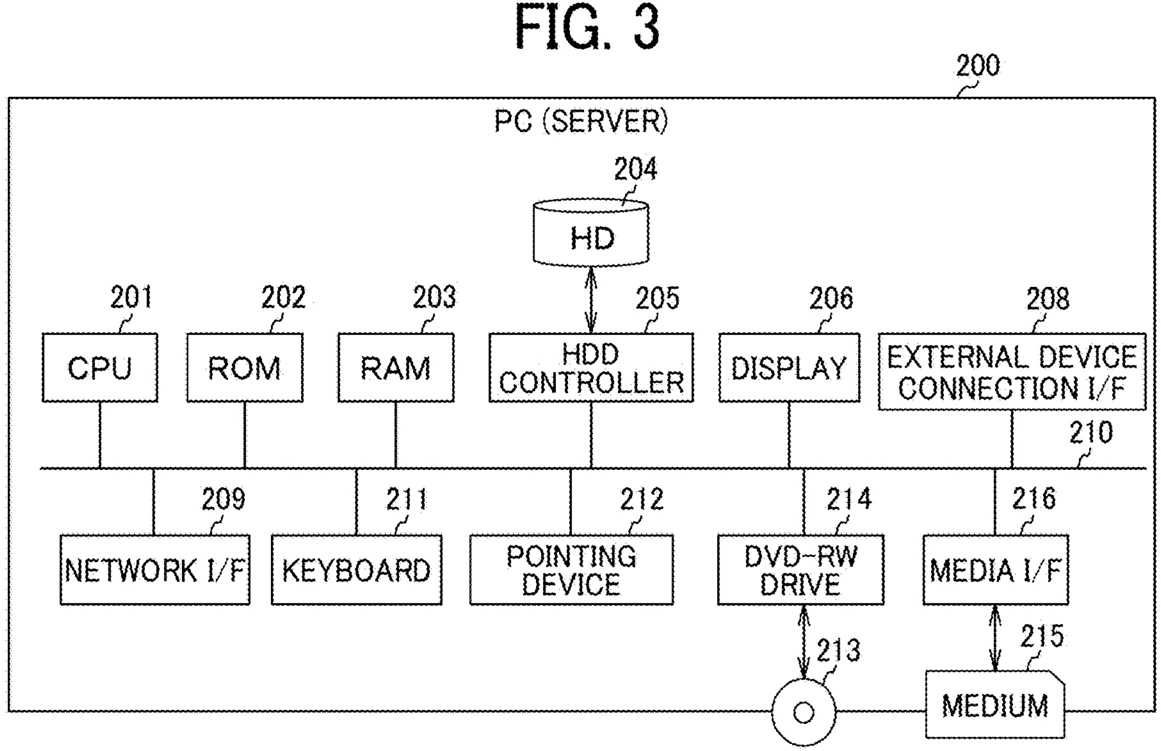
FIG. 3 is a diagram illustrating a hardware configuration of a server according to an embodiment.

FIG. 3 is a hardware configuration diagram of the server 200. As illustrated in FIG. 3, the server 200 includes a CPU 201, a ROM 202, a RAM 203, a HD 204, a HDD controller 205, a display 206, an external device connection I/F 208, a network I/F 209, a bus line 210, a keyboard 211, a pointing device 212, a digital versatile disk rewritable (DVD±RW) drive 214, and a media I/F 216.

The CPU 201 controls the overall operation of the server 200. The ROM 202 stores a program used for driving the CPU 201, such as an IPL. The RAM 203 is used as a work area for the CPU 201. The HD 204 stores various kinds of data such as a program. The HDD controller 205 controls reading or writing of various kinds of data from/to the HD 204 under the control of the CPU 201.

The display 206 displays various kinds of information such as a cursor, a menu, a window, a character, and an image. The external device connection I/F 208 is an interface for connecting various external devices. The external device may be, for example, a USB memory or a printer.

The network I/F 209 is an interface for performing data communication by using the communication network N. The bus line 210 is an address bus, a data bus, or the like for electrically connecting each of the elements such as the CPU 201 in FIG. 3.

The keyboard 211 is a kind of input device having a plurality of keys for inputting characters, numerical values, various instructions, and the like. The pointing device 212 is a kind of input device for selecting and executing various instructions, selecting a target to be processed, moving a cursor, and the like. The DVD±RW drive 214 controls reading or writing of various data from/to the DVD±RW 213, as an example of a removable recording medium.

The removable recording medium is not limited to the DVD±RW, but may be a digital versatile disk readable (DVD±R) or the like. The media I/F 216 controls reading or writing (memorizing) of data from/to a recording medium 215 such as a flash memory. The hardware configuration of each of the servers 200 in the information processing system S may be different from one another.

Figure 4:
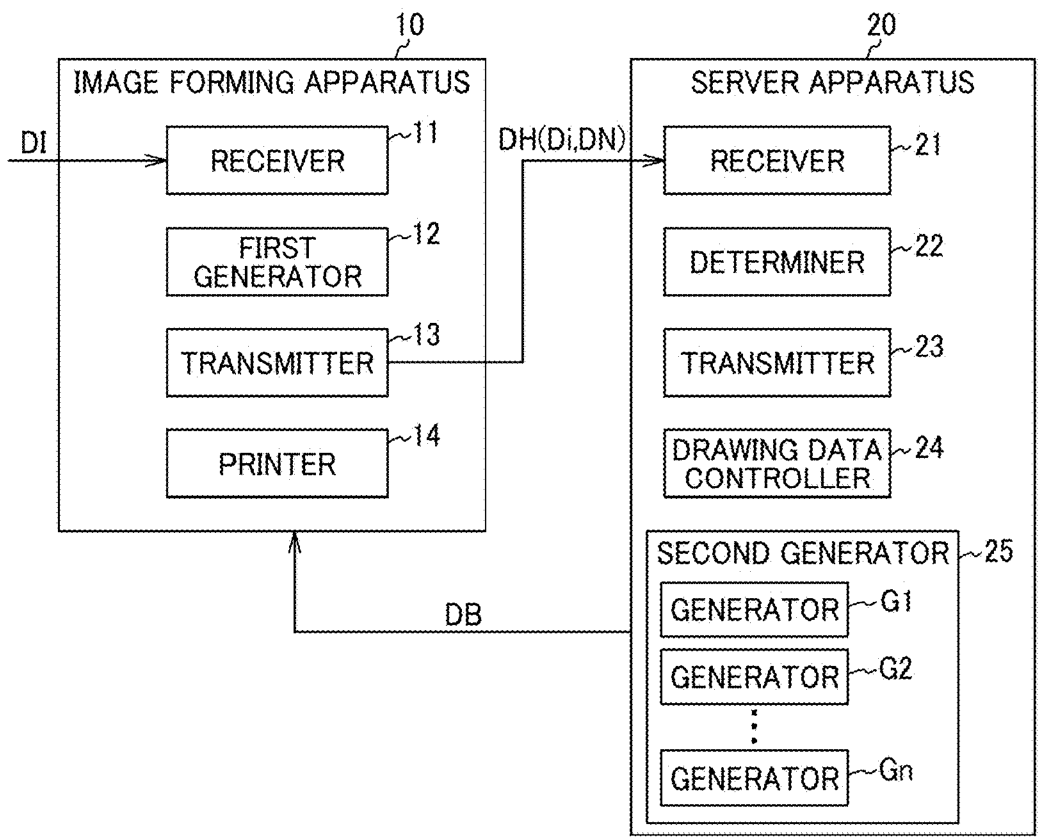
FIG. 4 is a functional block diagram of the information processing system according to an embodiment.

FIG. 4 is a functional block diagram of the information processing system S according to the embodiment. For example, the MFP 100 (CPU 101) functions as the image forming apparatus 10 by executing a program stored in any desired memory. Each of the servers 200 (each of the CPUs 201) functions as the server apparatus 20 by executing a program stored in any desired memory.

As illustrated in FIG. 4, the image forming apparatus 10 includes a receiver 11, a first generator 12, a transmitter 13, and a printer 14.

The receiver 11 receives print data DI (PDL data) transmitted from an external device (personal computer 300). The receiver 11 is implemented by the network I/F 150 and by an instruction from the CPU 101. The first generator 12 generates drawing data DB from the print data DI. More specifically, the first generator 12 executes RIP processing on the print data DI, and generates the drawing data DB (raster data). The first generator 12 is configured by the printer 132 that is executed under the control of the CPU 101.

As will be described later in detail, even when the first generator 12 receives the print data DI, the first generator 12 does not immediately generate the drawing data DB. More specifically, after the first generator 12 receives instruction information, which will be described later, from the server apparatus 20, the first generator 12 generates the drawing data DB. Instead of the instruction information, the first generator 12 may receive the drawing data DB from the server apparatus 20. In this case, the first generator 12 (the side of the image forming apparatus 10) does not execute the processing for generating the drawing data DB.

The transmitter 13 transmits determination information DH to the server apparatus 20. The transmitter 13 is implemented by the network I/F 150 and by an instruction from the CPU 101. As described above, the determination information DH includes a part of the print data DI (first determination information Di) received by the receiver 11. The determination information DH includes second determination information DN indicating a predetermined type of print data DI that can be printed by the image forming apparatus 10. The second determination information DN is stored in advance in a memory of the MFP 100 such as the RAM 203, for example. As described above, the entire print data DI may be transmitted to the server apparatus 20 (server 200). The determination information DH may include other information.

The printer 14 prints an image based on the print data DI by using the drawing data DB generated from the print data DI. The printer 14 is configured by the printer 132 that is executed under the control of the CPU 101. More specifically, when the first generator 12 generates the drawing data DB according to the instruction information from the server apparatus 20, the printer 14 prints an image by using the drawing data DB generated by the first generator 12. On the other hand, when the printer 14 receives the drawing data DB from the server apparatus 20, the printer 14 prints an image by using the drawing data DB received from the server apparatus 20.

As illustrated in FIG. 4, the server apparatus 20 includes a receiver 21, a determiner 22, a transmitter 23, a drawing data controller 24, and a second generator 25. The receiver 21 in the server apparatus 20 receives the determination information DH. The receiver 21 is implemented by the network I/F 209 and by an instruction from the CPU 201. The determination information DH is transmitted from the image forming apparatus 10 (transmitter 13).

The determiner 22 determines which, out of the image forming apparatus 10 (first generator 12) and the server apparatus 20 (second generator 25 which will be described below), is to generate the drawing data DB, based on the determination information DH. The determiner 22 is implemented by an instruction from the CPU 201.

For example, it is assumed that the predetermined type specified by the second determination information DN of the determination information DH does not include the type of the print data DI specified by the first determination information Di of the determination information DH. In this case, the determiner 22 determines that the server apparatus 20 generates the drawing data DB. That is, when the drawing data DB cannot be generated from the print data DI received by the image forming apparatus 10, the server apparatus 20 generates the drawing data DB.

Further, even when the image forming apparatus 10 can generate the drawing data DB from the print data DI, the determiner 22 may determine that the server apparatus 20 generates the drawing data DB from the print data DI. As an example of this case, compared to the case where the image forming apparatus 10 generates the drawing data DB, the case where the server apparatus 20 generates the drawing data DB may have higher image reproducibility.

For example, it is assumed that the page description language supported by the image forming apparatus 10 and the page description language of the print data DI received by the image forming apparatus 10 are the same, but the version of the page description language supported by the image forming apparatus 10 and the version of the page description language of the print data DI received by the image forming apparatus 10 are different from each other. Even in this case, the image forming apparatus 10 may generate the drawing data DB from the print data DI. However, compared to the case where the version supported by the device that converts the print data DI (image forming apparatus, server apparatus) is different from the version of the print data DI, the case where the versions match may be likely to have higher image reproducibility.

In view of the above, even when the image forming apparatus 10 can generate the drawing data DB from the print data DI, the determiner 22 according to the present embodiment may determine that the server apparatus 20 generates the drawing data DB according to, for example, the image reproducibility. For example, even when the image forming apparatus 10 can generate the drawing data DB from the print data DI, when the image forming apparatus 10 does not support the version of the print data DI and the server apparatus 20 supports the version of the print data DI, the determiner 22 determines that the server apparatus 20 generates the drawing data DB. With the configuration, image reproducibility increases.

When the determiner 22 determines that the image forming apparatus 10 (first generator 12) generates the drawing data DB, the transmitter 23 in the server apparatus 20 transmits the above-described instruction information to the image forming apparatus 10. The transmitter 23 is implemented by the network I/F 209 and by an instruction from the CPU 201. When the image forming apparatus 10 receives the instruction information, the image forming apparatus 10 generates the drawing data DB from the print data DI, and prints an image by using the drawing data DB.

When the determiner 22 determines that the server apparatus 20 generates the drawing data DB, the drawing data controller 24 controls the second generator 25 so that the server apparatus 20 generates the drawing data DB. The drawing data controller 24 is implemented by an instruction from the CPU 201. For example, when the determiner 22 determines that the server apparatus 20 generates the drawing data DB, the drawing data controller 24 specifies a generator G (described later) that can generate a type of drawing data DB (for example, drawing data DB with high image reproducibility) that is most suitable from the print data DI. The drawing data controller 24 controls the generator G so as to generate the drawing data DB.

The second generator 25 generates the drawing data DB from the print data DI. The second generator 25 is implemented by a program corresponding to the RIP processor, which is controlled by an instruction from the CPU 201. More specifically, when the determiner 22 determines that the server apparatus 20 generates the drawing data DB from the print data DI received by the image forming apparatus 10, the server apparatus 20 transmits, to the image forming apparatus 10, the instruction information for requesting transmission of the entire print data DI. When the print data DI (entire) is transmitted according to the instruction information, the second generator 25 generates the drawing data DB from the print data DI.

The second generator 25 according to the present embodiment is configured to include n generators G including a generator G1 to a generator Gn (n is a positive integer). As described above, each of the generators G corresponds to any one of the different types of print data DI. That is, the combination of the page description language and the version (RIP processor) supported by the generator G differs for each of the generators G.

When the determiner 22 determines that the server apparatus 20 generates the drawing data DB, the drawing data controller 24 identifies a generator G that generates the drawing data DB, and controls the identified generator G to generate the drawing data DB.

For example, the determiner 22 acquires generator identification information for identifying the generator G that can generate the drawing data DB from the print data DI, based on the first determination information Di. The drawing data controller 24 selects one of the second generators 25 based on the generator identification information, and then transmits a drawing data DB generation request to the selected second generator 25.

For example, the server apparatus 20 stores in its internal memory, for each of the second generators 25, generator identification information for identifying the second generator 25 and information indicating one or more types of data that are proces sable by the second generator 25, in association. The information indicating types of processable data indicates which type of drawing data DB can be generated from which type of print data DI, for example. In this disclosure, all of the generators G may be provided in one server 200, or the generators G may be distributed over a plurality of servers 200. For example, a plurality of servers each corresponding to the respective generators G may be provided individually.

In the present embodiment, it is not necessary to provide the generators G(1 to n) in the image forming apparatus 10. Therefore, the present embodiment has an advantage that the amount of data to be stored in the image forming apparatus 10 is reduced. Further, according to the present embodiment, the server apparatus 20 executes the processing for determining the device that generates the drawing data DB. Therefore, for example, compared to a configuration in which the processing is executed only by the image forming apparatus 10, the present embodiment has an advantage that the processing load on the image forming apparatus 10 can be reduced. Alternatively, when the server apparatus 20 is down (no response for a certain period of time, and the like), the image forming apparatus 10 may determine which of the image forming apparatus 10 and the server apparatus 20 is to generate the drawing data DB.

The following describes a comparative example, in which the information processing systems includes a plurality of image forming apparatuses 10, each of which stores n generators G(1 to n). In the comparative example, each of the image forming apparatuses 10 is able to generate the drawing data DB from at least n types of print data DI.

It is further assumed that, in the comparative example, each of the image forming apparatuses 10 is capable of generating the drawing data DB using a plurality of generators Gn+1. In this case, it is necessary to add (install) the generators Gn+1 to each of the image forming apparatuses 10. Therefore, for example, when the number of the image forming apparatuses 10 is large, there is a disadvantage that the above-described work burden is likely to be excessive.

In the present embodiment, as long as the generators Gn+1 are added to the server apparatus 20, the drawing data DB can be generated using any one of the generators Gn+1. Therefore, the present embodiment has an advantage that the workload can be reduced, as compared with the above-described comparative example.

As described above, the server 200 can be implemented by a plurality of server apparatuses 20. In this case, one server apparatus 20 can be provided with the functions of the receiver 21, the determiner 22, the transmitter 23, and the drawing data controller 24, such that the server apparatus 20 plays the role of the management device. Each of the generators G1, G2, . . . Gn constituting the second generator 25 is configured by the respective different server apparatuses 20. Therefore, the server apparatus 20 having the role of the management device can identify the device (server) for generating the drawing data, and the load on the entire system can be reduced. The server apparatus 20 functioning as the management device can collectively manage information about the types of data that can be processed by the respective generators G. The above example has the configuration that the image forming apparatus 10 transmits, to the server apparatus 20, information (second determination information DN) capable of identifying the type of the print data DI with which the MFP 100 can generate the drawing data DB. Alternatively, the server apparatus 20 may be configured to store the second determination information DN in each of the image forming apparatuses 10. In this case, the information for identifying the image forming apparatus 10 and the second determination information are stored in association with each other. The image forming apparatus 10 transmits, instead of the second determination information, the identification information of the image forming apparatus 10 to the server apparatus 20. The server apparatus 20 acquires the second determination information associated with the identification information of the image forming apparatus 10, and determines which, out of the image forming apparatus 10 and the server apparatus 20, generates the drawing data.

Figure 5:
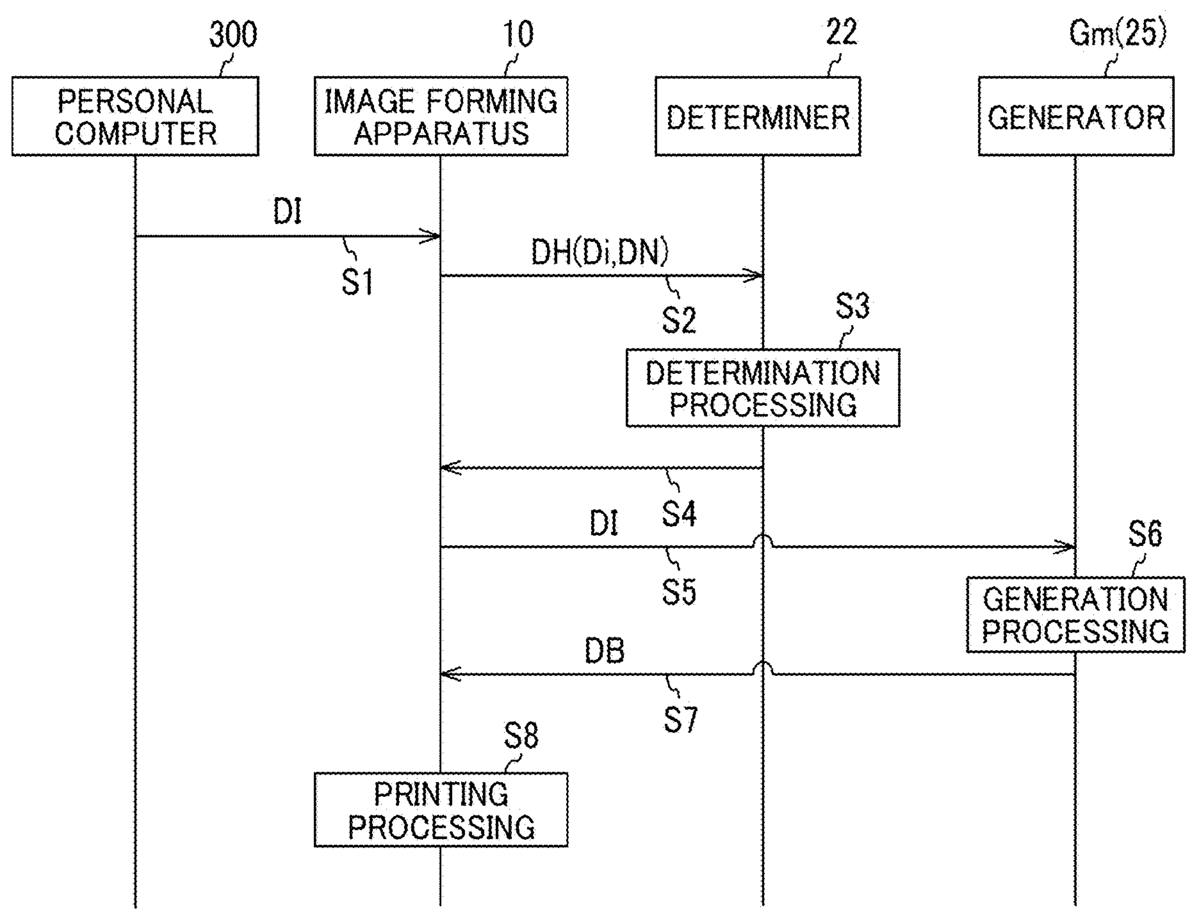
FIG. 5 is a sequence diagram illustrating example operation of processing printing, performed by the information processing system.

FIG. 5 is a sequence diagram illustrating example operation of printing, performed by the information processing system S. In the example of FIG. 5, it is assumed that the server apparatus 20 generates the drawing data DB.

As illustrated in FIG. 5, the personal computer 300 (client PC) transmits print data DI (PDL data) generated by the printer driver installed therein to the image forming apparatus 10 (S1). When the transmitter 13 in the image forming apparatus 10 receives the print data DI, the transmitter 13 transmits the determination information DH to the server apparatus 20. The receiver 21 in the server apparatus 20 transfers the determination information DH to the determiner 22 (the server apparatus 20) (S2). As described above, the determination information DH includes the first determination information Di that is a part of the print data DI and the second determination information DN that can specify the predetermined type of the print data DI.

When the determiner 22 receives the determination information DH, the determiner 22 executes determination processing (S3). In the determination processing, the determiner 22 determines a device (image forming apparatus 10, server apparatus 20) that generates the drawing data DB from the print data DI, based on the determination information DH. When the server apparatus 20 generates the drawing data DB in the determination processing, the determiner 22 determines which of the plurality of generators G generates the drawing data DB. More particularly, the determiner 22 acquires the identification information of the generator G that can generate the drawing data DB.

As described above, in the specific example of FIG. 5, it is assumed that the drawing data DB is generated at the server apparatus 20 (generator G). In this case, the server apparatus 20 transmits, to the image forming apparatus 10, an instruction to transmit the entire print data DI (S4). When the image forming apparatus 10 receives the instruction, the image forming apparatus 10 transmits the print data DI received from the personal computer 300 to the server apparatus 20. The server apparatus 20 transfers the print data DI received by the receiver 21 to the drawing data controller 24. The drawing data controller 24 transfers the print data DI to the generator G specified in S4 (S5). In transmitting the print data DI, the drawing data controller 24 also transmits information regarding the type of the drawing data DB to be output.

In the specific example of FIG. 5, it is determined that the generator Gm (m is a positive integer smaller than n) of the plurality of generators G generates the drawing data DB in the determination processing described above. In this case, the print data DI transmitted by the image forming apparatus 10 is input to the generator Gm.

When the generator Gm receives the print data DI, the generator Gm executes generation processing (S6). The generator Gm generates the drawing data DB from the print data DI in the generation processing. The drawing data DB generated in the generation processing is transmitted to the image forming apparatus 10 (S7). More particularly, the generator Gm transmits the generated drawing data DB to the drawing data controller 24. The drawing data controller 24 transmits the drawing data DB to the image forming apparatus 10 via the transmitter 23. When the image forming apparatus 10 receives the drawing data DB, the image forming apparatus 10 prints an image by using the drawing data DB (S8). The generator Gm may directly transmit the drawing data DB generated by the generator Gm to the image forming apparatus 10. In this case, in receiving the print data DI, the drawing data controller 24 receives information necessary for communicating with the image forming apparatus 10, such as identification information identifying the image forming apparatus 10. For example, when the second generators 25 are implemented as different server apparatuses 20 respectively, such a configuration is applicable.

The device that executes each of processing may be changed as appropriate. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The present invention may be implemented in various other ways as described below. In each of the following embodiments, the detailed description for the elements having the same operations and functions as those in the above-described embodiment will be appropriately omitted by using the reference numerals used in the description of the above-described embodiment.

FIGS. 6A to 6C are diagrams for explaining determination processing according to another embodiment. In this embodiment, it is assumed that the printer driver in the personal computer 300 is selected to generate the print data DI.

FIG. 6A is a diagram illustrating example information regarding the printer driver installed at the personal computer 300. The table of FIG. 6A includes various information on the printer driver D1, such as the name (D1) of the printer driver, the name (M1) of the development manufacturer of the printer driver, the page description language (L1) and the version (V6) of the page description language of the print data DI generated by the printer driver. The information illustrated in FIG. 6A is stored in a memory of the personal computer 300.

In this embodiment, even when the page description language L and the version V of the printer drivers D are the same, when the manufacturer M of the printer drivers D are different, it is determined that the types of print data DI to be generated by these printer drivers D are different. That is, if the manufacturer M differs, specific data structure of print data DI may differ. Further, the optional functions (for example, color correction functions) executed based on each print data DI may be different. Therefore, the image forming apparatus 10 may normally print drawing data DB with one print data DI, but may not be able to generate drawing data BD with another print data DI, even those print data DI are generated by the print drivers D having the same versions of PDL.

FIG. 6B is a diagram illustrating example information regarding a printer driver supported by the first generator 12 (hereinafter referred to as a printer generator Gd2) in the image forming apparatus 10. The information illustrated in FIG. 6B is stored in a memory of the image forming apparatus 10. The printer generator Gd2 identified with the information illustrated in FIG. 6B (here, a program which is the RIP processor installed at the image forming apparatus 10) corresponds to the driver D2. That is, the printer generator Gd2 corresponds to the print data DI generated by the driver D2. As illustrated in FIG. 6B, the development manufacturer of the printer generator Gd2 (driver D2) is the manufacturer M2. The printer generator Gd2 corresponds to the print data DI described in the page description language L1 which is version V6.

It is assumed that the print data DI generated by the printer driver, indicated by the table of FIG. 6A, is received by the image forming apparatus 10 having the generator Gd2 indicated by the table of FIG. 6B. In this case, the printer driver in the personal computer 300 (hereinafter referred to also as "PC side driver") is different from the printer driver supported by the printer generator Gd2 (hereinafter referred to also as "supporting driver").

However, the PC side driver and the supporting driver have the same page description language (L1) of the print data DI to be generated, and also have the same version (V6) of the page description language. Therefore, the printer generator Gd2 of FIG. 6B may be able to generate drawing data DB from the print data DI generated by the printer driver of FIG. 6A.

FIG. 6C is a diagram illustrating example information on the printer drivers supported by each of the generators G (d3 to d6) in the server apparatus 20. The information illustrated in FIG. 6C is stored in a memory in the server apparatus 20. As illustrated in FIG. 6C, the server apparatus 20 is provided with a plurality of generators G (also referred to as server generators G) corresponding to the plurality of printer drivers (D3 to D6). The identification information of each of the generators G is stored in the "Generator" field in FIG. 6C.

It is assumed that the image forming apparatus 10 having the generator d2 of FIG. 6B receives the print data DI from the print driver D1 of the personal computer 300 in FIG. 6A, and transmits the determination information DH to the server apparatus 20 having the generators d3 to d6 as illustrated in FIG. 6C.

In such case, the server apparatus 20 specifies the page description language L1, the version V6, and the manufacturer 1 of the print data DI received by the image forming apparatus 10, respectively, from the first determination information Di of the determination information DH. The server apparatus 20 identifies the page description language L1, the version V6, and the manufacturer M2 of the printer driver (D2) supported by the printer generator Gd2 of the image forming apparatus 10 from the second determination information DN of the determination information DH. The server apparatus 20 further determines the generator G to generate the drawing data DB, based on the information obtained from the determination information, and information on the printer drivers supported by the server generator G (d3 to d6).

For example, the server generator Gd3 indicated by the table of FIG. 6C corresponds to the driver D3 that generates the print data DI with the page description language L1 which is version V5. The version of the page description language to be generated of the driver D3 is different from the version of the page description language to be generated of the PC side driver (D1) of FIG. 6A. However, the page description language of the driver D3 is the same as the page description language of the PC side driver (D1) of FIG. 6A. Therefore, the server generator Gd3 can generate the drawing data DB from the print data DI generated by the PC side driver in FIG. 6A.

The server generator Gd4 in FIG. 6C corresponds to the driver D4 that generates the print data DI with the page description language L1 which is version V6. The page description language to be generated and the version of the driver D4 are the same as the page description language to be generated and the version of the PC side driver (D1) of FIG. 6A. Therefore, the server generator Gd4 can generate the drawing data DB from the print data DI generated by the PC side driver of FIG. 6A.

Referring to FG. 6C, the server apparatus 20 is provided with a server generator Gd5 corresponding to the driver D5, and a server generator Gd6 corresponding to the driver D6. However, as understood from FIG. 6, the page description language of the print data DI of each of the drivers D(5, 6) is different from the page description language of the PC side driver. Therefore, the server generator Gd5 and the server generator Gd6 cannot generate the drawing data DB from the print data DI generated by the PC side driver in FIG. 6A. As described above, the printer generator Gd2 can generate the drawing data DB from the print data DI generated by the PC side driver.

As can be understood from the description, in the above specific example, the printer generator Gd2 of the image forming apparatus 10, and the server generator Gd3 or the server generator Gd4 of the server apparatus 20 can generate the drawing data DB from the print data DI. When the server apparatus 20 has a plurality of generators G (printer generator, server generator) capable of generating the drawing data DB, the server apparatus 20 determines the generator G that actually generates the drawing data DB from the plurality of generators G based on the various information. More specifically, the server apparatus 20 determines the generator G that generates the drawing data DB in the priority order determined by the determination information.

For example, the server apparatus 20 determines the generator G that generates the drawing data DB based on reproducibility.

For example, the version of the page description language of the print data DI generated by the driver D2 and the driver D4 as illustrated in FIG. 6 is the same as the version (V6) of the page description language of the print data DI generated by the driver D1. On the other hand, the version (V5) of the page description language of the print data DI generated by the driver D3 is older than the version of the page description language of the print data DI generated by the driver D1. In this case, the server apparatus 20 does not select the server generator Gd3 corresponding to the driver D3 in order to improve the image producibility.

When there are a plurality of options in the above method, the method may be specified in another priority order.

In this case, the server apparatus 20 further determines either its own server generator Gd4 or the printer generator Gd2 of the image forming apparatus 10 according to another priority condition. For example, in a case where priority is given to reducing the processing load on the image forming apparatus 10, the server apparatus 20 determines to select the server generator Gd4 and generate the drawing data DB at the server apparatus 20. On the other hand, when priority is given to shortening the period from the generation of the print data DI to the printing of the image, the server apparatus 20 determines to select the printer generator Gd2 and generate the drawing data DB at the image forming apparatus 10.

Alternatively, the generator G that generates the drawing data DB may be determined based on the manufacturer M of the printer driver.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Any one of the above-described operations may be performed in various other ways, for example, in an order different from the one described above.

The invention claimed is:

1. A server apparatus communicably connected to an image forming apparatus, the server apparatus comprising circuitry configured to:
   - receive, from the image forming apparatus, determination information including first determination information identifying a type of print data received by the image forming apparatus, and second determination information identifying a type of print data with which the image forming apparatus can generate drawing data;
   - determine which of the image forming apparatus and the server apparatus is to generate drawing data from the print data, based on the determination information;
   - in response to the circuitry determining that the image forming apparatus is to generate the drawing data, transmit instruction information for instructing generation of the drawing data to the image forming apparatus; and
   - in response to the circuitry determining that the server apparatus is to generate the drawing data, control generation of the drawing data from the print data and transmission of the generated drawing data to the image forming apparatus.

2. The server apparatus of claim 1, wherein
   - the circuitry is configured to
     - execute a plurality of raster image processors (RIP) that respectively correspond to a plurality of types of print data from which drawing data can be generated,
     - in response to the circuitry determining that the server apparatus is to generate the drawing data, select one RIP processor from among the plurality of RIP processors based on the determination information, and
     - generate the drawing data from the print data using the selected RIP processor.

3. The server apparatus of claim 1, wherein
   - the first determination information is a part of the print data, and
   - the circuitry is configured transmit a request to the image forming apparatus for an entirety of the print data, in response to the circuitry determining that the server apparatus is to generate the drawing data.

4. The server apparatus of claim 1, wherein
   - the first determination information is at least one of a page description language and a version of the page description language of the print data, and
   - the second determination information is at least one of a page description language and a version of the page description language of the print data with which the image forming apparatus can generate drawing data.

5. The server apparatus of claim 1, wherein the circuitry is configured to
   - determine whether each of the image forming apparatus and the server apparatus is capable of generating the drawing data from the print data, based on the determination information,
   - determine which of the image forming apparatus and the server apparatus is to generate drawing data, based on a priority order determined by the determination information, in response to the circuitry determining that both the image forming apparatus and the server apparatus are capable of generating the drawing data from the print data.

6. A system comprising:
   - the server apparatus of claim 1; and
   - the image forming apparatus including another circuitry configured to
     - receive the print data,
     - generate a type of drawing data from the print data,
     - cause the image forming apparatus to print an image based on the drawing data, and
     - transmit the determination information including the first determination information for identifying a type of the print data and the second determination information for identifying the type of drawing data, in response to receiving the print data.

7. A server system communicably connected to an image forming apparatus, the server system comprising circuitry configured to:
   - receive, from the image forming apparatus, determination information including first determination information identifying a type of print data received by the image forming apparatus, and second determination information identifying a type of print data with which the image forming apparatus can generate drawing data;
   - determine which of the image forming apparatus and the server system is to generate drawing data from the print data, based on the determination information;
   - in response to the circuitry determining that the image forming apparatus is to generate the drawing data, transmit instruction information for instructing generation of the drawing data to the image forming apparatus; and
   - in response to the circuitry determining that the server system is to generate the drawing data, generate the drawing data from the print data and transmit the generated drawing data to the image forming apparatus.

8. The server system according to claim 7, wherein the circuitry is configured to
   - execute a plurality of RIP processors that respectively correspond to a plurality of types of print data from which drawing data can be generated,
   - in response to the circuitry determining that the server apparatus is to generate the drawing data, select one RIP processor from among the plurality of RIP processors based on the determination information, and
   - generate the drawing data from the print data using the selected RIP processor.

9. An information processing method performed by a server apparatus communicably connected to an image forming apparatus, the information processing method comprising:
   - receiving, from the image forming apparatus, determination information including first determination information identifying a type of print data received by the image forming apparatus, and second determination information identifying a type of print data with which the image forming apparatus can generate drawing data;
   - determining which of the image forming apparatus and the server apparatus is to generate drawing data from the print data, based on the determination information;
   - in response to determining that the image forming apparatus is to generate the drawing data, transmitting instruction information for instructing generation of the drawing data to the image forming apparatus; and in response to determining that the server apparatus is to generate the drawing data, controlling generation of the drawing data from the print data and transmission of the generated drawing data to the image forming apparatus.

10. The server apparatus of claim 1, wherein the first determination information includes a first page description language of the print data and a first version of the first page description language, the second determination information includes a second page description language of the print data and a second version of the second page description language, and the circuitry is configured to determine that the server apparatus is to generate the drawing data in response to the first page description language being the same as the second page description language and the first version being different from the second version.

11. The server system of claim 7, wherein the first determination information includes a first page description language of the print data and a first version of the first page description language, the second determination information includes a second page description language of the print data and a second version of the second page description language, and the circuitry is configured to determine that the server system is to generate the drawing data in response to the first page description language being the same as the second page description language and the first version being different from the second version.

12. The server system of claim 7, wherein the server system further comprises:

a plurality of server apparatuses; and a first server apparatus, of the plurality of server apparatuses, including second circuitry configured to receive the determination information, and transmit the determination information to a second server apparatus of the plurality of server apparatuses in response to determining that the first server apparatus is not capable of generating drawing data from the print data and the second server apparatus is capable of generating drawing data from the print data.

13. The information processing method of claim 9, wherein the first determination information includes a first page description language of the print data and a first version of the first page description language, the second determination information includes a second page description language of the print data and a second version of the second page description language, and the method further includes determining that the server apparatus is to generate the drawing data in response to the first page description language being the same as the second page description language and the first version being different from the second version.

14. The server apparatus of claim 1, wherein the circuitry is configured to determine which of the image forming apparatus and the server apparatus is to generate drawing data from the print data based on a comparison between the first determination information and the second determination information.

15. The server system of claim 7, wherein the circuitry is configured to determine which of the image forming apparatus and the server system is to generate drawing data from the print data based on a comparison between the first determination information and the second determination information.

16. The information processing method of claim 9, wherein the method further includes:

determining which of the image forming apparatus and the server apparatus is to generate drawing data from the print data based on a comparison between the first determination information and the second determination information.

* * * * *